(12) United States Patent
Stark et al.

(10) Patent No.: US 9,809,306 B2
(45) Date of Patent: Nov. 7, 2017

(54) CONTROLLING UNMANNED AERIAL VEHICLES AS A FLOCK TO SYNCHRONIZE FLIGHT IN AERIAL DISPLAYS

(71) Applicant: DISNEY ENTERPRISES, INC., Burbank, CA (US)

(72) Inventors: James Alexander Stark, South Pasadena, CA (US); Clifford Wong, Burbank, CA (US); Robert Scott Trowbridge, La Canada, CA (US)

(73) Assignee: Disney Enterprises, Inc., Burbank, CA (US)

( * ) Notice: Subject to any disclaimer, the term of this patent is extended or adjusted under 35 U.S.C. 154(b) by 114 days.

(21) Appl. No.: 14/819,048

(22) Filed: Aug. 5, 2015

(65) Prior Publication Data
US 2015/0338855 A1    Nov. 26, 2015

Related U.S. Application Data

(62) Division of application No. 13/768,823, filed on Feb. 15, 2013, now Pat. No. 9,102,406.

(51) Int. Cl.
*B64D 47/02*         (2006.01)
*B64C 39/02*         (2006.01)
(Continued)

(52) U.S. Cl.
CPC ............ *B64C 39/024* (2013.01); *B64D 47/02* (2013.01); *G05D 1/0027* (2013.01); *G05D 1/0808* (2013.01); *G05D 1/104* (2013.01); *G08G 5/0021* (2013.01); *G08G 5/04* (2013.01); *G08G 5/045* (2013.01); *B64C 2201/024* (2013.01); *B64C 2201/027* (2013.01); *B64C 2201/128* (2013.01); *B64C 2201/143* (2013.01); *B64C 2201/146* (2013.01); *G05D 1/102* (2013.01); *G08G 5/0069* (2013.01)

(58) Field of Classification Search
CPC .................................................. B64C 39/024
See application file for complete search history.

(56) References Cited

U.S. PATENT DOCUMENTS 7,777,674 B1    8/2010 Haddadin et al.
9,104,201 B1*   8/2015 Pillai ..................... B64C 39/024
(Continued)

*Primary Examiner* — Truc M Do
(74) *Attorney, Agent, or Firm* — Marsh Fischmann & Breyfogle LLP; Kent A. Lembke

(57) ABSTRACT

A system for flock-based control of a plurality of unmanned aerial vehicles (UAVs). The system includes UAVs each including a processor executing a local control module and memory accessible by the processor for use by the local control module. The system includes a ground station system with a processor executing a fleet manager module and with memory storing a different flight plan for each of the UAVs. The flight plans are stored on the UAVs, and, during flight operations, each of the local control modules independently controls the corresponding UAV to execute its flight plan without ongoing control from the fleet manager module. The fleet manager module is operable to initiate flight operations by concurrently triggering initiation of the flight plans by the multiple UAVs. Further, the local control modules monitor front and back end communication channels and, when a channel is lost, operate the UAV in a safe mode.

19 Claims, 3 Drawing Sheets

(51) Int. Cl.
  *G08G 5/04* (2006.01)
  *G08G 5/00* (2006.01)
  *G05D 1/08* (2006.01)
  *G05D 1/00* (2006.01)
  *G05D 1/10* (2006.01)

(56) References Cited

U.S. PATENT DOCUMENTS

| | | |
|---|---|---|
| 9,533,759 B2 * | 1/2017 | Jones .................... G05D 1/102 |
| 2002/0161489 A1 | 10/2002 | Johnson |
| 2004/0134337 A1 | 7/2004 | Solomon |
| 2004/0196834 A1 | 10/2004 | Ofek et al. |
| 2005/0004723 A1 | 1/2005 | Duggan et al. |
| 2006/0006279 A1 | 1/2006 | Kisor |
| 2006/0121418 A1 | 6/2006 | DeMarco et al. |
| 2006/0167596 A1 * | 7/2006 | Bodin .................. G05D 1/0027 701/3 |
| 2006/0167599 A1 | 7/2006 | Bodin et al. |
| 2006/0167622 A1 | 7/2006 | Bodin et al. |
| 2006/0198346 A1 | 9/2006 | Liu et al. |
| 2007/0021880 A1 * | 1/2007 | Appleby ................ G05D 1/104 701/23 |
| 2007/0078600 A1 | 4/2007 | Fregene et al. |
| 2007/0093946 A1 | 4/2007 | Gideoni |
| 2007/0221782 A1 | 9/2007 | Cerchie et al. |
| 2007/0244608 A1 | 10/2007 | Rath et al. |
| 2008/0033604 A1 | 2/2008 | Margolin |
| 2008/0103639 A1 | 5/2008 | Troy et al. |
| 2008/0243372 A1 * | 10/2008 | Bodin .................. G05D 1/0027 701/23 |
| 2009/0118875 A1 * | 5/2009 | Stroud .................. G01S 5/0027 701/3 |
| 2009/0125163 A1 | 5/2009 | Duggan et al. |
| 2009/0326735 A1 * | 12/2009 | Wood .................. G05D 1/0027 701/2 |
| 2010/0017114 A1 * | 1/2010 | Tehan .................. G05D 1/0646 701/423 |
| 2010/0082183 A1 | 4/2010 | Lassini et al. |
| 2010/0084513 A1 | 4/2010 | Gariepy et al. |
| 2010/0100269 A1 * | 4/2010 | Ekhaguere ............ G05D 1/101 701/26 |
| 2010/0163621 A1 * | 7/2010 | Ben-Asher ............ G05D 1/104 235/412 |
| 2010/0268409 A1 * | 10/2010 | Vian ...................... G05D 1/104 701/24 |
| 2010/0292873 A1 | 11/2010 | Duggan et al. |
| 2011/0029804 A1 | 2/2011 | Hadden et al. |
| 2012/0004844 A1 * | 1/2012 | Sahasrabudhe ........ G05D 1/104 701/300 |
| 2012/0056041 A1 * | 3/2012 | Rhee ................................ 701/3 |
| 2012/0271461 A1 * | 10/2012 | Spata ...................... G01W 1/00 700/276 |
| 2014/0231590 A1 * | 8/2014 | Trowbridge ........... A63H 27/12 244/175 |

* cited by examiner

CONTROLLING UNMANNED AERIAL VEHICLES AS A FLOCK TO SYNCHRONIZE FLIGHT IN AERIAL DISPLAYS

CROSS-REFERENCE TO RELATED APPLICATIONS

This application is a divisional of U.S. patent application Ser. No. 13/768,823, filed on Feb. 15, 2013, entitled "CONTROLLING UNMANNED AERIAL VEHICLES AS A FLOCK TO SYNCHRONIZE FLIGHT IN AERIAL DISPLAYS," which is hereby incorporated in its entirety by reference.

BACKGROUND

1. Field of the Description

The present invention relates, in general, to control of unmanned aerial vehicles (UAVs) such as multicopters, and, more particularly, to control methods and systems for use with flocks of UAVs that are useful for safely moving the UAVs in a synchronized or choreographed manner as may be useful in many entertainment applications to provide an aerial display with the UAVs.

2. Relevant Background

In recent years, there has been a growing interest in utilizing unmanned aerial vehicles (UAVs) such as remotely controlled drones/airplanes, helicopters, and multicopters to perform a wide variety of tasks. An ongoing challenge, though, is how to better control the UAVs for each of these particular uses or while performing differing tasks.

An exemplary UAV that is receiving growing attention is the multirotor or multicopter. This UAV is a rotorcraft with more than two rotors, and multicopters often use fixed-pitch blades with control of vehicle motion being achieved by varying the relative speed of each rotor to change the thrust and torque produced by each rotor. Multicopters may also be named quadcopters, hexacopters, and octocopters to refer to their number of rotors (e.g., 4, 6, or 8, respectively).

Due to their ease of both construction and control, multirotor aircraft are frequently used in model and radio control aircraft projects such as to provide a lower budget option for creating aerial photography and videos. In these implementations, the UAVs may carry as a payload one or more cameras and be remotely controlled to move over a targeted object or geographical area. Electronically controlled multicopters may be powered using a central lithium polymer or other battery driving brushless motors and propellers with control provided with an onboard flight controller/stabilization board selectively throttling the motors in response to control signals and that may be in communication with an operator (e.g., on the ground) using a radio controller unit.

In some applications, it is desirable or useful to perform a task through the use of two or more UAVs that need to be controlled in a centralized or organized manner to perform the task. For example, numerous drone aircraft or UAVs such as multicopters or flying robots may be used to provide surveillance of a geographical area. In such an application, swarm control or swarming may be used to control the UAVs as they fly over the targeted geographical area. A swarm may be thought of as a self-organizing particle system with numerous autonomous, reflexive agents (e.g., UAVs are the particles in this example) whose collective movements may be determined by local influences such as wind and obstacles such as another nearby UAV.

While swarming, the UAVs move in the space over the monitored area in a random manner while remaining within the defined outer boundaries. The UAVs are independent and are often locally controlled, which may include communicating with a nearby UAV to determine which one moves or whether both should move to avoid an impending collision. Collisions are an issue as the UAVs move independently and randomly and often will have crossing paths in the shared airspace. Swarming allows the UAVs to fly over a large area, which is useful in monitoring applications. However, designing controllers for use in UAVs for swarms of flying objects or UAVs remains a challenge to manufacturers of UAVs and, in some cases, collisions have proven very difficult to entirely eliminate.

When using multiple UAVs or flying robots to perform tasks, other control techniques have been used to allow their safe use. In some applications, collisions are an accepted risk of the control method, with the area under the flying robots being kept free of human observers. In other applications, each UAV is controlled from a central controller that is typically placed on the ground. A predetermined flight path is designed or selected for each UAV such that none of the flight paths cross, and a tolerance or spatial envelope is provided to account for flight variances due to conditions such as wind that may cause a UAV to stray off its predefined course. In these applications, the UAVs operate independently with no collisions occurring, but the UAVs typically remain a relatively large distance apart without close interaction or overlapping and/or crossing flight paths.

While these control techniques have value for certain uses of UAVs, there are many applications where it is desirable to operate the UAVs in different manners. Specifically, it is desirable in some settings to synchronize the movement and operation of the UAVs to have the UAVs or flying robots operate in a choreographed manner to perform a task or provide an aerial display, which is not possible through swarm control where the UAVs move randomly and independently. Further, it is desirable in these and other applications to allow the UAVs to cross their flight paths or to fly relatively close by or around another UAV, which is not possible with control processes defining independent and non-crossing flight paths.

Hence, there remains a need for a control method and/or system for use in operating a number of UAVs such as multicopters to provide synchronized flight. Preferably, such a method would be non-swarming since it is important that there are no collisions and since it is useful to avoid the appearance of merely random movement (at least in some applications). Further, it is desirable for the UAVs to each react safely to environmental conditions such as changes in wind speeds and directions during group flight of choreographed UAVs. In some cases, the control should allow for flight paths of the UAVs to cross in an airspace so as to achieve a desired effect or to perform a particular task that requires crossing paths.

SUMMARY

The following description provides a control method and system for controlling two to many UAVs, such as but not limited to multicopters, during synchronized flight. As an exemplary use, the control method and system may be used to provide a large, entertaining aerial light show. This may be useful for theme parks, outdoor concert venues, sports stadiums, and other settings to integrate a story or other choreographed display that can amaze and surprise observers of the aerial display.

Aerial shows or displays, which often include lighting effects, are growing in popularity at many outdoor venues, and the control processes described herein may be used to control tens to hundreds of untethered, remotely controlled, flying objects (e.g., multicopters each with a show-based payload). As will become clear, the control method and system are useful to provide aerial shows by directing the flying objects in a safe and repeatable manner. In some cases, a single operator may be able to safely conduct and execute multiple coordinated flight paths and/or synchronized flight motions for more than one UAV over an uncontrolled environment (e.g., where observers may walk or stand below the flying UAVs).

More particularly, a system is provided for controlling flight of a plurality of unmanned aerial vehicles (UAVs). The system includes a plurality of UAVs each including a processor executing a local control module and further including memory accessible by the processor for use by the local control module. The system also includes a ground station system (or ground control system (GCS)) with a processor executing a fleet manager module and with memory storing a different flight plan for each of the UAVs. In practice, the flight plans are stored in the memory of each of the UAVs (e.g., a different flight plan for each UAV). Then, during flight operations, each of the local control modules independently controls the UAV to execute the flight plan stored in the memory of the UAV.

According to one aspect of the system, each of the UAVs includes a front end radio and a back end radio, and each of the UAVs communicates with a front end transceiver of the GCS to establish a front end communication channel and communicates with a back end transceiver of the GCS to establish a back end communication channel. In such embodiments, the fleet manager module is operable to initiate flight operations by concurrently triggering initiation of the flight plans by the multiple UAVs. Further, the local control module of each of the UAVs periodically determines status of the front and back end communication channels and, when the status determination indicates a loss of one of the front and back end communication channels, operates the UAV in a predefined safe operating mode.

According to another aspect of the system, the local control module of each of the UAVs operates to gather telemetry data including determining a present position of the UAV and further operates to communicate the gathered telemetry data to the GSC over the back end communication channel. In such an embodiment, the fleet manager module may compare, for each of the UAVs, the present position of the UAV with an expected position of the UAV and, based on the comparing, transmit a GCS action to control operations for at least one of the UAVs to override the local control module.

In some cases, the local control module of each of the UAVs operates to periodically compare a present position of the UAV with the flight plan and, based on the comparing, modifying control of the UAV. In these cases, the modifying of the control may include altering a flight speed or selecting a new way point in the flight plan as a target way point for the UAV. In other cases, the local control of each of the UAVs may operate to detect another one of the UAVs within a safety envelope about the UAV and, in response, operate a radio to communicate a collision warning message to the detected one of the UAVs to cause the detected one of the UAVs to alter its course to move out of the safety envelope. In some specific implementations, the UAVs are multicopters, and the local control module of each of the UAVs operates to detect pitch and roll of the multicopter and, when the pitch or the roll exceeds a predefined maximum, switches operations of the multicopter to a safe operating mode.

The description also teaches a flight control method. In this control method, a first step may be, at a plurality of multicopters, receiving a flight plan unique to each of the multicopters. A next step may be concurrently operating the multicopters to execute the flight plans. The method further includes providing a communications channel between pairs of the multicopters and, with a first one of the multicopters detecting a second one of the multicopters in a predefined space proximal to the first one of the multicopters. The method also includes, with the first one of the multicopters, transmitting a message to the second multicopter over the communication channel between the first and second multicopters causing the second multicopter to change position to avoid collision.

In some implementations of the method, the flight plans include a plurality of way points for each of the multicopters. In such implementations, the method may further include, during the operating of the multicopters to execute the flight plans, adjusting flight speed or course of one of the multicopters based on comparison of a present position and one of the way points. The flight plans may further include an elapsed time period for each of the way points, and then, the adjusting of the flight speed or course may be performed when the elapsed time is exceeded by the one of the multicopters.

In other implementations of the method, the method also includes receiving at one of the multicopters control commands from a ground control system and, in response, performing the control commands to operate the one of the multicopters, whereby the ground control system may operate to override local control of the multicopters. In other cases, though, the method includes, with each of the multicopters, gathering a set of telemetry data, communicating the telemetry data to a ground control system using a back end radio on the multicopter, and, when communications with the ground control system via the back end radio is lost for any one of the multicopters, switching operations of the one of the multicopters to a safe operating mode.

DETAILED DESCRIPTION

Briefly, the present description is directed toward a control method and system (or multiple UAV systems incorporating such control methods/systems) for use in controlling a flock of UAVs numbering 2 to 10 or more UAVs (e.g., 10 to 100 or more multicopters). Briefly, the control method uses hierarchical-based supervisory control with multicasting techniques along with adaptive logic including onboard or local control modules provided on each UAV to adjust flight paths to safely avoid collisions based on communications with nearby UAVs. The result of the described control of the multiple UAVs in an airspace such as over a theme park or stadium is a flocking behavior in which the UAVs appear to move in a synchronized manner with movements that are not completely independent nor completely centrally controlled.

The control method may be implemented in a system with four general components or pieces: a fleet management station (or ground station); flying objects or UAVs; at least dual-path communications between the ground station and the UAVs, e.g., much of the description below highlights use of dual-channel communication but some embodiments may use three or more transceivers onboard a UAV (such as to provide a front channel (supervisory), a back channel (autonomous), and a show channel (lighting, payload actuators, and so on)); and stage/show management. These four components or aspects of the control method/system are described below with reference to the figures.

Figure 1:
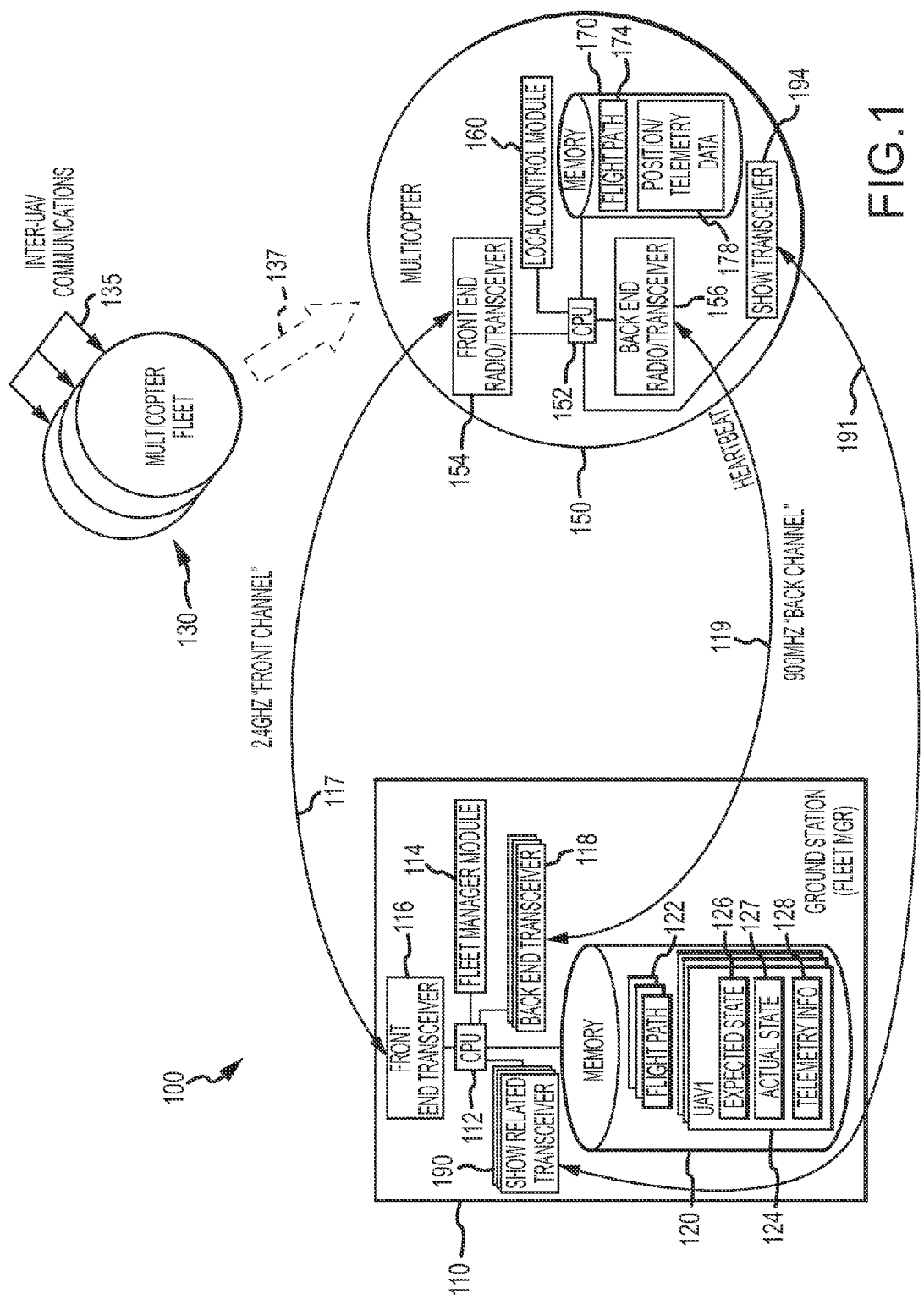
FIG. 1 is functional block diagram of a multiple UAV system useful for implementing the flight control techniques described herein.

First, with regard to dual-path communications, FIG. 1 illustrates a system 100 that may be used to control flying objects in a safe and repeatable manner. The system 100 includes a ground station or fleet manager 110 along with a plurality of multicopters (or UAVs) 130, with each being implemented (as shown via arrow 137) with the configuration of multicopter 150. As shown, the fleet of multicopters 130 is configured for inter-UAV or multicopter communications 135, and, as explained below, this intercommunication allows the multicopters 130 to safely react to a determination that another multicopter 130 is in a close proximity to avoid collisions while generally remaining on a predefined flight path. During runtime, ground station/fleet manager 110 is used for sending commands to maintain show performance and quality and to monitor safety information. During non-runtime, it uploads the show requirements.

Collisions are currently handled by the ground station 110. It performs the following logic: (a) stores all GPS locations & headings from the UAVs 130 via the back channel 119; (b) calculates a "sphere of influence" on each UAV 130, e.g., a proximity distance to trigger a collision event, and, if a UAV 130 enters this sphere around a specific UAV 130, a collision event is triggered; (c) estimates the velocity of the vehicle based on location data; (d) determines through a nearest neighbor algorithm if a possible collision will occur; and (e) presents to the operator on a user interface provided on system 110 (or a monitor device linked to system 110) that a possible collision will occur between two vehicles 130.

The ground station 110 will present the operator with actions to invoke in avoiding a collision (though each vehicle will have a default action if the operator chooses not to do anything, e.g., an action timeout). These actions/options may include: (a) automatic (a predefined action is executed); (b) land in place; (c) return to home; (d) go to a safe position; (e) "bounce" which may involve pushing one of the vehicles 130 outside the sphere of influence and rerunning the collision logic. The sphere of influence distance may be predetermined by GPS accuracy and current weather conditions. One can say the sphere of influence is the sphere surrounding a UAV, and, if another UAV enters this sphere where the heading of each vehicle intersects, the system will trigger a collision event.

Dual-path communication between the ground station 110 and the multicopter 150 is provided by each flying object or multicopter 150 having two communication channels shown at 117 and 119 in FIG. 1. To this end, the ground station 110 includes a front-end radio or transceiver 116 and a back end radio or transceiver 118, and the multicopter 150 also has two radios 154 and 156 configured for communicating 117, 119 with the station radios 116, 118. Some embodiments may further include a show radio or transceiver 190 in the ground station 110 that communicates over show channel 191 with a radio/transceiver 194 on the multicopter 150. The first or front end channel 117 provides a high speed communications channel (e.g., 2.4 GHz or the like) that is useful to provide choreographed movement of the multicopters 150 (e.g., when the UAVs 130 are not simply following a flight path but have time-synchronized movements from position to position in an airspace).

For example, the front channel 117 may be thought of as a robust, low-bandwidth "primary" channel for synchronized motion control and manual override control by the ground station. The back channel 119 may be thought of as a "secondary" high-bandwidth channel. The back channel 119 may be used for transmitting telemetry from the multicopter 150 to the ground station 110, for the ground station 110 to transmit signals for supervisory control of the multicopter 150, and for a back up communication channel should the front end channel 117 fail to one or more of the multicopters 150. Further, the show channel 191 may be used for non-flight-related communications.

The ground station 110 is shown to include a processor(s) 112 that runs software to perform the ground station control functions discussed herein such as the fleet manager module 114. The processor 112 controls operations of the radios/transceivers 116, 118 including managing memory 120 to store data received from the multicopter 150 over channel 117, 119. The memory 120 is shown to store flight paths 122 that may be downloaded or provided over front end channel 117 to the multicopter 150 (of those in fleet 130) for use by a local control module 160 to control movement of the multicopter 150 (e.g., via selectively throttling of motors turning one or more of the rotors). The memory 120 also stores a set or file of data 124 for each multicopter 150 of a fleet 130, and the data 124 may include an expected state 126 for the multicopter 150, an actual state 127 of the multicopter 150, and other telemetry data 128 (which may be passed via the back end channel 119 to the ground station 110).

Each multicopter 150 is shown to include one or more processors 152 that control operation of the two radios 154, 156 so as to process received data/signals on channel 117, 119 and to, as appropriate, store data in onboard memory 170. The processor 152 also may run or execute code, programs, or software such as a local control module 160 to perform the UAV-control functions described herein. The memory 170 may be used to store a flight path 174 provided by the ground station 110 and to also store determined positions and telemetry data 178 (that may be provided to the ground station 119 as shown in memory 128). The telemetry data 178 may include a heartbeat (each UAV in fleet 130 indicates to the ground station that it is operational or "alive"). The telemetry data 178 may further include a present position of the multicopter 150 (e.g., a three dimensional location in the airspace) and the present speed of the multicopter 150. Further, the telemetry data 178 may include the health of any monitored components on the multicopter 150 and a battery life/status as well as other monitored data.

The fleet management component or module 114 acts to monitor the expected state 126 and the actual state 127 of each of the flying objects 150. For example, the module 114 may compare a present position or traveling speed of a multicopter 150 with its expected state 126 (which may be defined by a flight path 122 or a choreographed and time-synchronized movement of UAVs 130 such as in a light or other aerial display/show). Based on this monitoring, the fleet management module 114 may make adjustments such as using the following priorities: localization (e.g., position of the multicopter 150 with respect to other UAVs/multicopters); environment (e.g., to adjust for high wind conditions or the like); safety (e.g., return the multicopter 150 to a safe location or operating mode if it or other UAVs are not operating as expected); show performance (e.g., adjust position, speed, or other operating parameters to meet show needs); fleet status; and operator convenience/performance needs.

As discussed above, the fleet management module 114 and local control module 160 are configured to work together to provide flocking-type control. In use, the inter-UAV communications 135 are used to allow operational data to flow or spread hierarchically among the UAVs 130 rather than relying upon centralized/ground control alone. In other words, the fleet management module 114 provides a level of centralized control or central logic that acts to control the movement of the UAVs/multicopters 130 such as by providing flight paths 122 and/or making real time adjustments based on a comparison of expected state 126 and actual state 127 (or for safety reasons). With regard to inter-UAV communications, it may be useful to note the following: (a) some units may be designated as master nodes talking with the fleet manager; and (b) the master nodes may operate to send out in-flight calculated information or commands to remaining UAVs.

The movement/control is not swarm-based control in part because swarming UAVs can collide or have an inherent lack of safety and because the system 100 is designed to avoid random movements as want flock or synchronized movements among the multicopters 130, 150. However, the inter-UAV communications 135 as processed and generated by the local control module allows each multicopter 150 to react safely to environment conditions such as increasing or direction-changing wind and presence/movement of neighboring multicopters 130, 150 as crossing flight paths is allowed in the system 100 (e.g., may be required by flight paths 122). In other words, the onboard logic 160 acts to control the multicopter 150 movements so as to avoid collisions while attempting to stay generally on the flight path 174.

Figure 2:
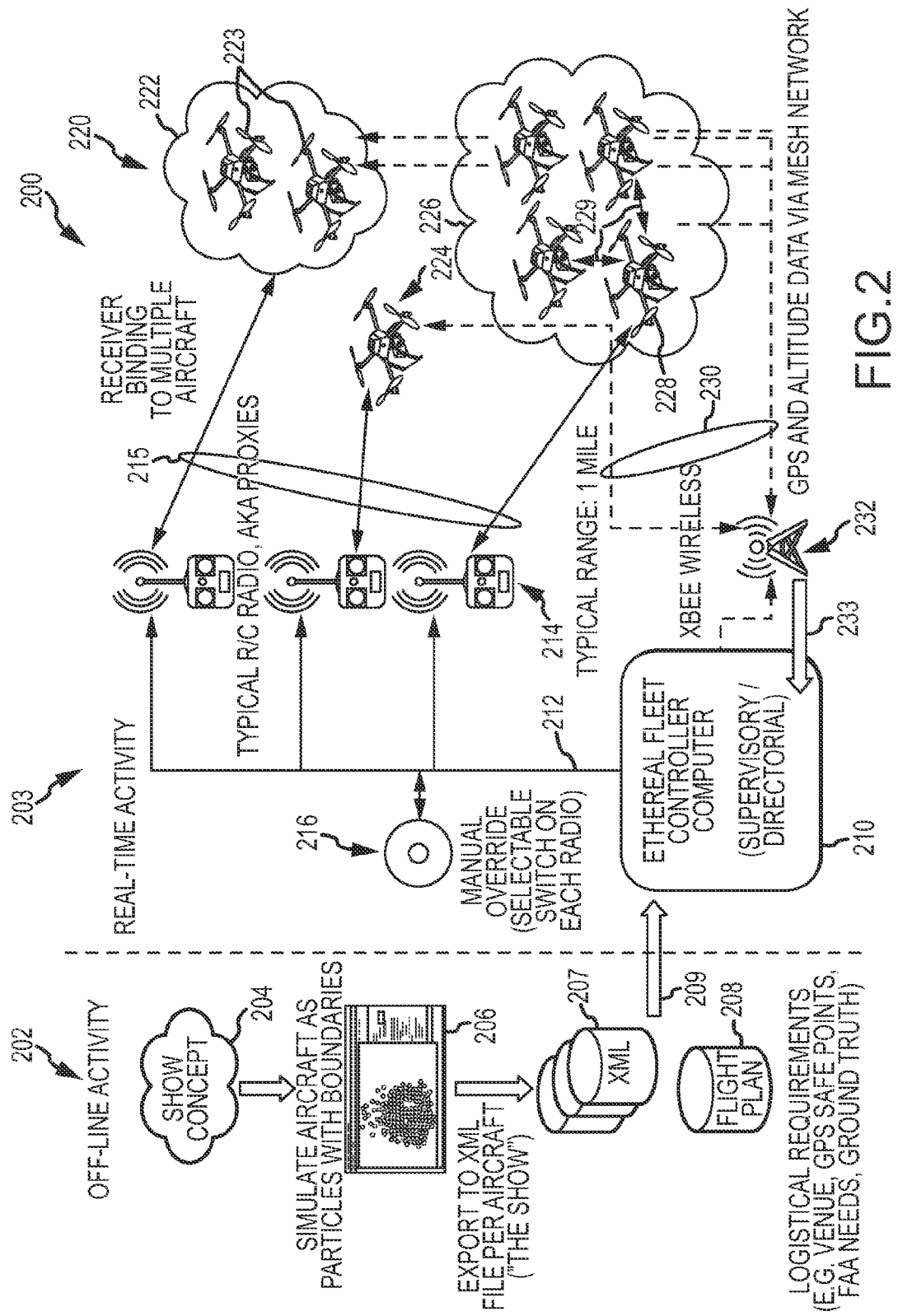
FIG. 2 is a functional schematic or block diagram of a system for use in providing flight management or flight control over two or more flying objects such as UAVs.

FIG. 2 illustrates a system (or a flight management control system) 200 for use in managing or controlling UAVs to provide an aerial vehicle flock with synchronized flight. The system 200 is shown to be made up of or include components used to perform off-line activity at 202 and used to perform on-line activity at 203. The off-line activity 202 may include designing or selecting a show concept or choreographed movement 204 for a plurality of UAVs to achieve a particular effect or perform a task(s).

The show concept (e.g., digital data stored in memory or the like) 204 may then be processed with a computer or other device to simulate as particles with spatial boundaries as shown at 206. For example, each multicopter to be used to provide an aerial display or show (or to perform an aerial task) may be modeled as a particle, and a three dimensional space such as a sphere with a predefined diameter may be used to define a safety envelope for that UAV or flying object. The safety envelope or space is used to reduce the risk of a collision between two UAVs (e.g., create and choreograph a show to avoid collisions and not allow two UAVs to have their safety envelopes intersect/overlap as the UAVs move along their flight paths).

The created show or task for the multiple UAVs is then exported to memory or other devices as shown at 207 for processing, with this "show" typically including a file per each UAV or unmanned flying object. Each of these files is processed to generate real world coordinates for each UAV to be achieved over time during a show (or performance of a choreographed task(s)). This processing creates individual flight plans 208 for each UAV, and such processing or generating of the flight plans 208 may include processing the modeled show 207 based on specific logistical requirements. These requirements for example may modify a show to suit a particular venue (e.g., is the air space the same size and shape as in the simulation and, if not, modification may be useful to change or set real world coordinates for one or more of the UAVs).

The logistical requirements may also include setting a ground truth for the venue and adding safe or "home" points (e.g., with GPS or other location settings) where each vehicle can be safely positioned such as at the beginning and end of a show or when a safety override is imparted (e.g., "return to home"). The stage/show management component 202 may be considered a component that translates central show controller commands, which may be from a foreign system, to fleet actions that are sent 209 to the fleet management component either through scripts (e.g., data files), real time computer messages, and/or hardware triggers.

Figure 3:
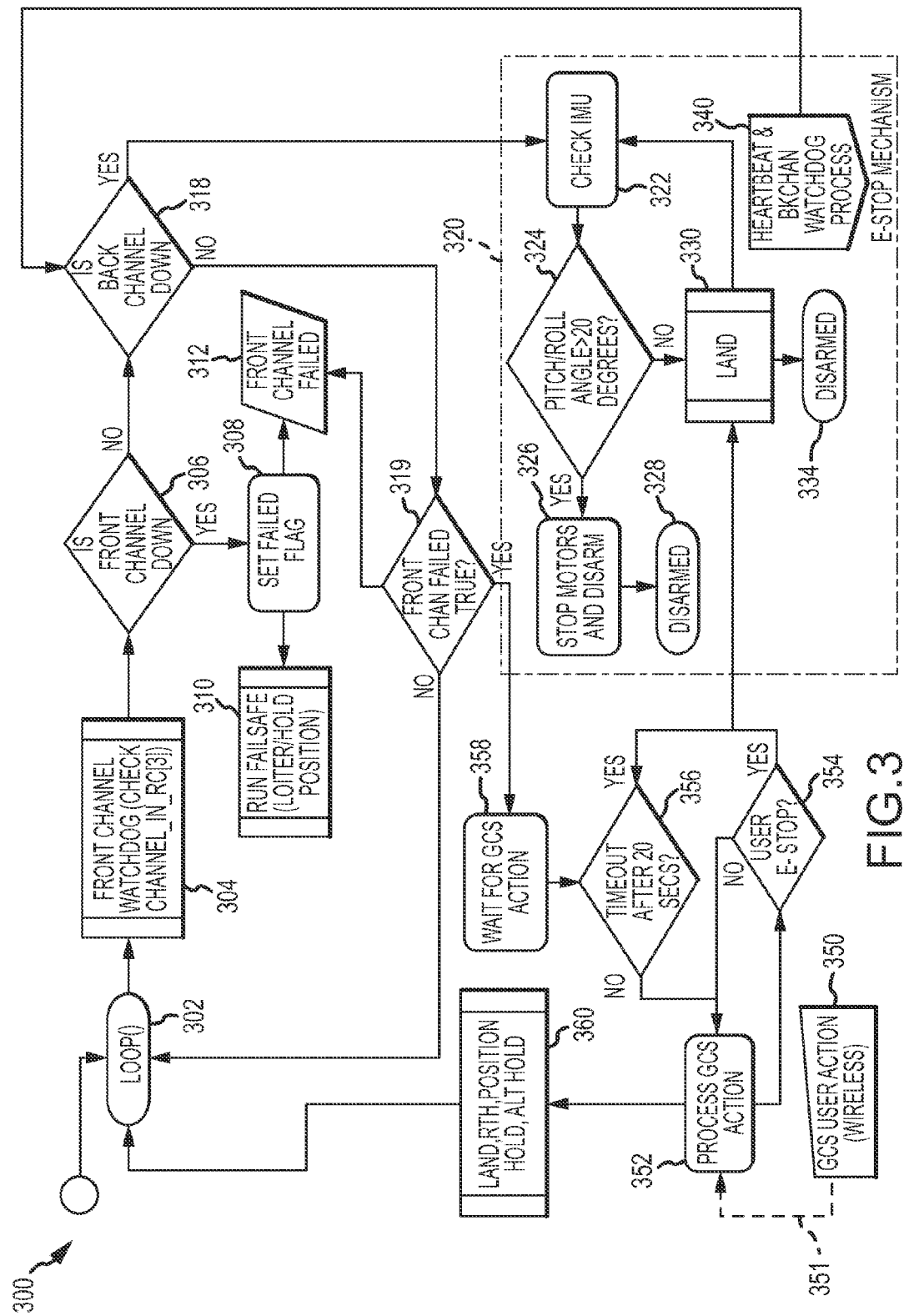
FIG. 3 provides a logic diagram for the onboard logic running or provided for execution on each UAV such as part of a multicopter control panel/board.

At 209, the flight plans are provided to the ground station 210 (or ethereal fleet controller/computer or ground control system (GCS) as used in FIG. 3). The system 200 further includes a number of UAVs 220 shown in the form of multicopters in this example. The multicopters 220 may be in groups/sets with set 222 including two copters 223, set 224 including one copter, and set 226 including four copters. These sets may act or function together, at least for a portion of a show or flight path, to perform a particular display or task.

In other cases, all of the multicopters may be considered part of large set that moves as a flock or otherwise has its movements time synchronized and/or choreographed by flight plans 208. As shown at 229, a multicopter 228 in the group 220 can communicate with its nearby or neighboring multicopters so as to determine their presence, to determine their proximity, and to process (when and if needed) the flight plan, the determined neighbor position, and other environmental data to modify their flight plan to avoid collision and/or communicate 229 with the neighboring multicopter to instruct it to move or otherwise change its flight plan/movement to avoid collision.

As discussed with reference to FIG. 1, the system 200 also includes two communication channels between the GCS 210 and each of the multcopters 220. The front end channel is shown at 212 with the GCS using remote control radios or wireless transceivers 214 to communicate data/control signals 215 to each of the multicopters 220. In this manner, the GCS or receiver 210 binds to multiple aircraft so as to allow multicasting of control signals such as to wirelessly load flight plans 208 to each of the multicopters 220 before flight operations are initiated by the GCS 210.

In some cases, a manual override (selectable switch, for example, on each radio 214) 216 is provided to allow an operator to signal 215 a particular multicopter 220 to switch to safe mode (e.g., to return to home, to safely drop to ground, and so on). The back end channel for communications is shown at 230 with each of the multicopters 220, which may have two or more radios as discussed with reference to FIG. 1, communicating telemetry or other data (e.g., GPS and altitude data via a mesh network) to the GCS 210 as shown to be relayed 233 via a wireless transceiver device 232 (e.g., with a range when working with UAV radios of about 1 mile). Each multicopter 220 may include a unique identifier or ID with their telemetry data (e.g., the same ID as used to associate a flight plan 208 with a particular multicopter 220).

In system 200, each of the flying objects 220 may be a multicopter that optionally may be modified to carry a variety of payloads (or units). For example, the payload may be one or more light sources. The payload may include the communication devices, e.g., two or more radios discussed herein, to provide multiple communication channels. Any communication channel may be linked to the GCS 210 (or its fleet management module discussed above with reference to FIG. 1). In one implementation, the multicopters 220 were each modified via software (e.g., local control module 160 in FIG. 1) to provide all the logic (e.g., see FIG. 3 and corresponding discussion) required for operation in a show environment including flocking logic, safety strategies, light show scripts, character expression logic, and alternative show maneuvers.

FIG. 3 illustrates a flowchart or logic diagram of a safety control method or logic 300 that may be implemented on board each multicopter or flying object (e.g., via the local control module 160 as shown for a multicopter 150 in FIG. 1). In the safety process 300, a process loop begins at 302 and a first step may be to perform a check of the front end communication channel at 304. At 306, the process 300 continues with determining whether the front channel is still up/available or is now down. If determined at 306 to be down, a flag is set at 308 indicating the front end communication channel has failed as shown at 312.

At this point, the process 300 may continue at 310 with controlling the multicopter in a failsafe mode as shown at 310, and this may involve having the multicopter loiter or hold its present position for a preset period of time until the front end channel is available (as determined by repeating step 304) or until instructed otherwise by GCS user action 350 (e.g., an operator may identify a loitering multicopter in the group/flock and instruct it to take certain action such as to return to home (RTH)).

The process 300 may include an emergency stop cycle or subroutine 320. In the stop cycle 320, an ongoing (frequent periodicity) step 340 or a heartbeat of the multicopter may be performed. In this step 340, the logic/processor onboard may transmit an "alive" pulse/signal to the GCS and also determine its present position and other telemetry, which is also transmitted to the GCS via the back end communication channel. As part of step 340, a check is performed to determine a status of the back end channel to the GCS. The following are examples of multiple modes of failure that may result in different reactions: (a) show failure (e.g., missed waypoint) to which the system may respond by adapting to stay safe and continue flight; (b) front channel communication failure to which the system may respond by going to autonomous mode to stay safe and possibly cancel a show if needed; (c) back channel communication failure to which the system may respond by waiting for confirmation and hold in place until communication is reestablished (if not, then land); and (d) full communication failure to which the system may respond by landing in place.

After step 340 is performed, the method 300 continues at 318 with a determination of whether or not the back channel is down. If not, the method 300 can continue at 319 with a determination of whether or not the front channel flag 312 is set. If not, the method 300 can return to perform another loop 302. If the front end flag is set at 312 (fail is true) as determined at 319, the method 300 may continue at 358 with waiting for a control signal or action to be performed by the GCS (e.g., an operator uses the GCS to transmit a control signal). At 356, a determination is made regarding a timeout after a preset period of time.

If the timeout period has not elapsed, the method 300 continues at 352 with processing of a GCS action that is provided by wireless signal/transmission 351 from the GCS 350. A user or operator may provide input at a ground station or GCS to perform a user-initiated emergency stop, which is checked for at 354. If an e-stop is not issued in the transmission 351 as determined at 354, the method 300 may continue at 352 with further processing of the action 350 such as to determine that instructions have been received to operate the multicopter in a particular manner.

These responses/actions are shown at 360 with the local/onboard control logic acting to land the multicopter, to return the multicopter to home, to hold the present position (but changing altitude is allowed), to hold altitude (but wind or other environmental conditions may cause position to change over time), or other action. This step 360 is followed with a new control/safety loop 302. In this manner, a user can provide at 350 override or direct control signals to each multicopter that can override a program/flight plan at any time or in response to loss of the front end communication channel. When a timeout period has elapsed at 356, the e-stop cycle 320 may be performed. In particular, the onboard logic may act to land the multicopter as shown at 330 if no GCS action is received within the present time (e.g., 10 to 30 seconds or the like).

The e-stop cycle 320 may also be initiated when it is determined by the onboard control logic at 318 that the back end channel is down. In such a case, step 322 is performed to check the IMU and then determine at 324 whether the pitch or roll angle is greater than some preset acceptable limit (e.g., 15 to 30 degrees or more). If this pitch is not exceeded, the e-stop cycle 320 continues at 330 with landing the multicopter. If the pitch or roll angle is greater than the preset maximum at 324, the e-stop cycle 320 continues at 326 with stopping the motors and otherwise "disarming" the multicopter to place it in a disarmed state at 328 (at which point the multicopter will fall to the ground rather than gently landing as is the case at 330).

With the above discussion of a flight control system (system 100 and 200) understood, it may be useful to more specifically discuss functions of particular components of such a flight control system and the onboard logic and controls of each multicopter or other UAV, with regard to the ground control system (GCS), the GCS controls preflight, show state, and safety.

During preflight, an operator uses the GCS to load a flight plan onto each UAV (e.g., transmitted wirelessly via the front end channel for storage in memory accessible by the local control module of the UAV). During a show, the GCS and its fleet manager module act to run the flight plan previously loaded on the UAV. This "running" may involve an operator using a trigger module or mechanism of the fleet manager module to say start or "go" to initiate all the multicopters or UAVs to begin to run a flight plan. Typically, before this step, each UAV is placed at a ground location for takeoff or at an aerial home position, with these home or start positions being included in the overall flight plan for a show or to perform a task as a flock of UAVs.

During the show, the GCS actively monitors safety and an operator can initiate a GCS user action as shown in FIG. 3. More typically, though, the GCS monitors the operation of all the UAVs in the flock by processing the heartbeat and telemetry data provided by each of the UAVs via the back channel communications from the back end radio or transceiver provided on each UAV. In some embodiments, the fleet manager module has software/logic that compares the actual state of each UAV against the expected state at that particular time for the UAV according to the presently enacted flight plan.

If the actual state does not compare favorably (e.g., the position of the UAV is outside an acceptable range such as several-to-many feet off course), the fleet manager module may generate an alert (audio and/or visible) on a GCS monitor or other linked device to warn an operator of this possibly unsafe condition. At this point, the warned operator may take action (user action in FIG. 3) to correct the operations of the UAV(s) or to instruct the UAV to return to home or take other actions.

For example, the fleet manager module may allow the operator to select or "hit" a safety button (or selectable icon), and the fleet manager module would communicate via the front end or back end communication channel to instruct the UAV to go into a predefined safety mode of operation (e.g., see box 360 of FIG. 3). This safety mode instruction or GCS is processed by the local control module on the UAV, with the UAV drive system correspondingly operated to position the UAV in a safe location or mode of operation. Such a safety mode/operation can be issued on a per UAV basis or to the entire flock concurrently (or even to a subset of such a flock). In some embodiments, the fleet manager module actively negotiates with each UAVs local control module (or its subroutine handling safe operations); in other words, hitting the "safety button" on the GCS does not necessarily require the affected UAV to immediately take action as the UAV control system may act to complete a task or first attempt a control adjustment to correct its operations prior to allowing GCS override (such as causing the UAV to return-to-home).

After the "go" or start signal is issued by the fleet manager module/GCS upon an operator input, the GCS along with the local control software/hardware on each UAV works to safely perform the preloaded flight plan/show. As discussed above, the control method and system taught herein combines centralized control (e.g., to allow manual override for safety or other reasons during a show/flight-based task) with smart UAVs to more effectively provide flock-type movement of the UAVs. In other words, the UAVs may each be given a particular flight plan that they work toward over time (during a show time period) while attempting to respond to environmental conditions such as changing wind or the unexpected presence of another UAV within or near to their safety window (or safe operating envelope surrounding each UAV such as a sphere of several-to-many feet such as 10 to 30 feet or the like in which no other UAV typically will travel to avoid collisions).

During operations, the GCS is used to trigger each of the UAVs to begin their stored flight plan starting from a home or show/task start point (e.g., each UAV may be placed at differing launch points or be hovering/flying at a particular ground point at a predefined start altitude). In some cases after the "go" is received by a UAV, each UAV uses its local control module (or other software/programming) to attempt to follow the flight plan but with no time constraints. In other words, the flight plan may define a series of earth points or way points along with elevation/altitude values for the UAV. In these embodiments, the UAV is controlled in a relatively fluid manner and not tied to accomplishing tasks in a certain amount of time (e.g., the flight plan does not require the UAV be at a particular location at a particular time after the go signal is received).

In some implementations such as those using multicopters for the UAVs, the flight plan is built up assuming that each UAV travels at a preset and constant flight speed. This flight speed may be set independently for each UAV or may be the same (or within a relatively small range) for each of the UAVs. In other cases, though, the local control module may be adapted to adjust the flight speed to suit the environmental conditions.

For example, stronger winds may make it beneficial to speed up (or at least operate rotors of a multicopter at a faster rate) when moving against a strong head wind and to slow down when moving with the strong tail wind. The speed of the wind may be determined at the UAV with the local control module and sensors provided as part of the payload or the wind direction and speed information may be provided by the GCS to each of the UAVs. In some cases, flock control is preferred such that each UAV has its speed adjusted commonly, e.g., each UAV runs at like flight speeds while moving in a like direction so as to appear to have synchronized and non-random movement.

In some embodiments, each UAV acts independently to try to continue to follow its own flight plan. Each flight plan differs at least in the fact that each UAV begins at a differing start point or home and moves toward its first way point. To this end, each UAV is equipped as needed to determine its present three dimensional position that includes a latitude/longitude position (e.g., a GPS position or similar position data) along with its present altitude or height above the ground. The local control module uses this present position data to determine and modify (if necessary) its present direction or heading to continue to move toward the next way point in its flight plan. This may involve changing it course and also its angle of attack to reach the desired height at the way point.

Generally, the GCS monitors for safe operations of the UAVs as discussed with reference to FIG. 3, but an operator may take steps to manually override a particular one of the many UAVs to provide better control of that UAV. For example, the fleet control module of the GCS may operate to compare an expected position of the UAV with its actual position (provided via back end channel in its telemetry or other data). A warning may be provided in a GUI that the UAV is trending off course or is outside an accepted tolerance for reaching its next way point.

For example, the GUI may show properly operating and positioned UAVs in green, UAVs that are off course or out of position a safe amount in yellow, and UAVs outside of a safe envelope in red. The red/unsafe UAVs may be handled automatically or manually to cause them to enter a safe mode of operation (return to home, for example). The yellow UAVs that are operating outside of desired conditions, though, may be manually operated to try to assist them in returning to their flight path such as by manually changing speed, direction, angle of attack, or the like to more quickly bring the UAV to a desired way point. After manual operations are complete, the control may be returned from the GCS to the local control module for local control of the UAV based on the flight plan stored in its memory. Note, the GCS may be configured to evaluate collision issues and execute collision avoidance commands to preserve show quality (i.e., flight performance) in degrading weather conditions.

In other embodiments, a local control module of a UAV may operate to adjust the flight plan during flight to better react to environmental conditions (such as gusts of wind that may throw it, at least temporarily, off course). For example, a flight plan may provide a time relative to a start time (when "go" was signaled by the GCS to the UAVs) to reach each of its way points on the flight plan. One embodiment may call for the UAV to determine a distance to a next way point of the flight plan and its present estimated time of arrival (e.g., using changes in its earth position to determine its true speed or rate of travel). If the time of arrival is not within a window about a preset/goal arrival time, the local control module may act to increase the flight speed of the UAV such as by increasing the rate of rotation for the rotors of a multicopter. Likewise, if the UAV is moving too quickly (e.g., strong tail wind), the UAV's local control module may act to slow the flight speed. In this manner, the movement of the UAVs may remain better synchronized to provide a flock control.

In other cases, though, the local control module of the multicopter or other UAV acts to determine whether or not a way point was reached within a predefined time window, with the flight plan defining times for being at each way point relative to a start/go time. If not (e.g., did not reach a way point at Time "X" plus an allowable delay), the local control module may act to modify the flight plan by directing the UAV to skip the next way point and fly directly to the way point following the next. For example, a flight plan may include way points A to Z. If a local control module determines that a predefined time window for way point C was not achieved, the local control module may skip or remove way point D from the flight plan and cause the UAV to take a direction/course (e.g., a straight line or other predefined path) to way point E. In this way, the flight speed is maintained (e.g., all UAVs fly at the same speed) while allowing the UAV to "catch up" if they fall behind their flight plan (e.g., defining a set of way points or earth points to pass through or nearby within a predefined time period that may correspond with a time to perform a show/display or perform a task with the multicopters).

With regard to safety and monitoring of operations, each UAV may store a definition of a geofence that defines an outer perimeter (and an inner area in some cases) or boundary of a geographical area. The UAV's local control module compares the present position determined for the UAV during a flight and compares this position to the geofence. If this boundary is crossed (or is being approached such as within a preset distance from the geofence), the local control module may act to promptly return the UAV back within the geofence boundaries. In other cases, the UAV may be switched into a safe operating mode (as discussed with reference to FIG. 3), and this may cause the UAV to return-to-home or otherwise safely return to ground (or other safe holding position). For example, the geofence may define the boundaries of a lagoon or stadium field, and the UAVs may fly over this geographical area (or within an area offset from the physical boundaries of this area to define a somewhat smaller area) but not outside it so as to avoid flying directly over any people in an audience to provide enhanced viewing safety.

Further, regarding safe UAV operations, some embodiments of a flight control method and system involve configuring the UAVs to have UAV-to-UAV (or multicopter-to-multicopter) communications or other technologies provided onboard to avoid collisions without reliance upon the GCS to intervene. Each UAV may use its local control module to operate on an ongoing basis to detect when another UAV comes within a predefined distance from the UAV such as within a sphere of 10 to 30 feet or the like. The first UAV to detect such a condition (or both UAVs if a tie) generates a collision warning message and transmits this message to the offending/nearby UAV to alter its course or present position to move out of the first UAV's air space. For example, the UAV receiving such a collision warning message may store an evasive action in its memory and initiate this action (a fixed movement such as angling to the right or left a preset angle). The evasion may be taken for a preset time period and then the UAV may return to following its flight plan (e.g., recalculate a course to the next way point from its new present location or the like).

As discussed with regard to FIG. 3, the local control module of each UAV may perform other functions to control its own flight to ensure safe operations. For example, the local control module uses a front end radio and a back end radio to communicate with the fleet manager module of the GCS. The status of these communication channels is monitored by the local control module, and, when either communication channel is detected to be lost (e.g., an expected receipt confirmation from the GCS is not received to a transmission of a telemetry data by a UAV), the local control module may react to this loss of communication by entering a safe operating mode (e.g., land, return to home, hold position, or the like).

In another example, the UAV's local control module monitors the present orientation and/or altitude of the UAV and if the orientation is outside an acceptable range (e.g., pitch or roll exceeds 20 degrees or the like for a multicopter) or if the altitude is too high or too low, the local control module may also act to enter the UAV into a safe operating mode (before or after attempting to correct the operating problem).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:
1. A flight control method, comprising:
at individual ones of a plurality of multicopters, receiving a flight plan that is unique to the individual ones of the multicopters, wherein the flight plans differ from other ones of the flight plans and wherein each of the flight plans includes a plurality of way points, whereby flight of the multicopters is non-random;
concurrently operating the multicopters to execute the flight plans;
providing a communications channel between pairs of the multicopters;
with a first one of the multicopters detecting a second one of the multicopters in a predefined space proximal to the first one of the multicopters; and
with the first one of the multicopters, transmitting an instruction to the second multicopter, over the communication channel between the first and second multicopters, to move out of the predefined space and, with the second multicopter, receiving the instruction and responding by operating the second multicopter to change position to move out of the predefined space.

2. The method of claim 1, wherein the method further includes, during the operating of the multicopters to execute the flight plans, adjusting flight speed or course of one of the multicopters based on comparison of a present position and one of the way points.

3. The method of claim 2, wherein the flight plans further include an elapsed time period for at least some of the way points.

4. The method of claim 3, wherein the adjusting of the flight speed or course is performed when the elapsed time is exceeded by the one of the multicopters.

5. The method of claim 1, further comprising receiving at one of the multicopters control commands from a ground control system and, in response, performing the control commands to operate the one of the multicopters, whereby the ground control system may operate to override local control of the multicopters.

6. The method of claim 1, further including with each of the multicopters, gathering a set of telemetry data, communicating the telemetry data to a ground control system using a back end radio on the multicopter.

7. The method of claim 6, further including when communications with the ground control system via the back end radio is lost for any one of the multicopters, switching operations of the one of the multicopters to a safe operating mode.

8. A flight control method, comprising:
at a plurality of multicopters, receiving a flight plan unique to individual ones of the multicopters, wherein the flight plans comprise a plurality of way points for each of the multicopters, wherein the flight plans differ from one another, and wherein the flight plans include an elapsed time period for the way points;
operating the multicopters to execute the flight plans to provide non-swarming control of the multicopters;
providing a communications channel between pairs of the multicopters;
during the operating of the multicopters to execute the flight plans, adjusting flight speed or course of one of the multicopters based on comparison of a present position and one of the way points;
with a first one of the multicopters detecting a second one of the multicopters in a predefined space proximal to the first one of the multicopters; and
with the first one of the multicopters, transmitting a message to the second multicopter over the communication channel between the first and second multicopters causing the second multicopter to change position to avoid collision.

9. The method of claim 8, wherein the adjusting of the flight speed or course is performed when the elapsed time is exceeded by the one of the multicopters.

10. The method of claim 8, further comprising receiving at one of the multicopters control commands from a ground control system and, in response, performing the control commands to operate the one of the multicopters, whereby the ground control system may operate to override local control of the multicopters.

11. The method of claim 8, further including with each of the multicopters, gathering a set of telemetry data, communicating the telemetry data to a ground control system using a back end radio on the multicopter.

12. The method of claim 11, further including when communications with the ground control system via the back end radio is lost for any one of the multicopters, switching operations of the one of the multicopters to a safe operating mode.

13. A flight control method, comprising:
at a plurality of unmanned aerial vehicles, storing in memory a flight plan unique to each of the UAVs, wherein individual ones of the flight plans comprises a plurality of predefined way points;
with a local control module executed by a processor on individual ones of the UAVs, operating the UAVs to execute the flight plans;
for the UAVs, providing a front end communication channel and a back end communication channel with a ground station system;
with the local control module of each of the UAVs, periodically determining status of the front and back end communication channels;
when the status determination for one of the UAVs indicates a loss of one of the front and back end communication channels, operating the one of the UAVs in a predefined safe operating mode;
with the local control module of each of the UAVs, operating to detect another one of the UAVs within a safety envelope about the UAV and in response, operating a radio to communicate a collision warning message to the detected one of the UAVs to cause the detected one of the UAVs to alter its course to move out of the safety envelope.

14. The method of claim 13, wherein the method further includes, during the operating of the multicopters to execute the flight plans, adjusting flight speed or course of one of the multicopters based on comparison of a present position and one of the way points.

15. The method of claim 14, wherein the flight plans further include an elapsed time period for each of the way points.

16. The method of claim 15, wherein the adjusting of the flight speed or course is performed when the elapsed time is exceeded by the one of the multicopters.

17. The method of claim 13, further comprising with the local control module of each of the UAVs, gathering telemetry data including determining a present position of the UAV and communicating the gathered telemetry data to the ground station system over the back end communication channel.

18. The method of claim 17, further comprising with the ground station system comparing, for each of the UAVs, the present position of the UAV with an expected position of the UAV and, based on the comparing, transmitting an action to control operations for at least one of the UAVs to override the local control module.

19. The method of claim 13, wherein the UAVs are multicopters and wherein the method further comprises detecting, with the local control module of each of the UAVs, pitch and roll of the UAV and, when the pitch or the roll exceeds a predefined maximum, switching operations of the UAV to a safe operating mode.

* * * * *